United States Patent
Foote et al.

(10) Patent No.: US 7,073,177 B2
(45) Date of Patent: Jul. 4, 2006

(54) RESOURCE MANAGING SYSTEM FOR CHANGING RESOURCE CONSUMPTION STATE OF THE LOWER PRIORITY RESOURCE ENTITY TO MORE RESTRICTIVE STATE WHEN RESOURCE REACHED CRITICAL LEVEL

(75) Inventors: William F. Foote, Los Angeles, CA (US); Hideya Kawahara, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 933 days.

(21) Appl. No.: 10/045,514

(22) Filed: Oct. 26, 2001

(65) Prior Publication Data

US 2004/0205760 A1  Oct. 14, 2004

Related U.S. Application Data

(60) Provisional application No. 60/290,309, filed on May 10, 2001.

(51) Int. Cl.
  *G06F 9/46* (2006.01)

(52) U.S. Cl. ..................................... 718/104
(58) Field of Classification Search ................ 718/104; 705/8
  See application file for complete search history.

(56) References Cited

U.S. PATENT DOCUMENTS

| | | | | |
|---|---|---|---|---|
| 5,548,506 A | * | 8/1996 | Srinivasan ..................... | 705/8 |
| 5,748,468 A | | 5/1998 | Notenboom et al. ........ | 364/132 |
| 5,826,239 A | * | 10/1998 | Du et al. ...................... | 705/8 |
| 5,991,793 A | | 11/1999 | Mukaida et al. ............ | 709/104 |
| 6,016,503 A | | 1/2000 | Overby, Jr. et al. ......... | 709/104 |

FOREIGN PATENT DOCUMENTS

| | | |
|---|---|---|
| EP | 1083485 A2 | 3/2001 |
| WO | WO95/07578 | 3/1995 |

OTHER PUBLICATIONS

Foote, Bill "Description of JavaOS and PersonalJava", Jul. 15, 2002, Release date of PersonalJava 1.0 is Dec. 1997.

Czajkowski, Grzegorz, et al., "*JRes: A Resource Accounting Interface for Java,*" In Proceedings of the 1998 ACM OOPSLA Conference, Vancouver, BC, Oct. 1998.

(Continued)

*Primary Examiner*—Meng-Al T. An
*Assistant Examiner*—Camquy Truong
(74) *Attorney, Agent, or Firm*—Beyer Weaver & Thomas, LLP

(57) ABSTRACT

Disclosed are methods and apparatus for managing resources. In general terms, a resource manager manages resource consumption of several resource entities which are each capable of consuming resources. The resource manager tracks the availability of such resources and determines whether a resource is critically short or reaches a particular usage level. When a resource becomes critically short or reaches a particular usage level, the resource manager selects one or more resource entities based on one or more criteria. For example, a resource entity which has the least restrictive resource usage policy or state is selected. The resource manager then requests that the selected resource entity changes its resource usage state to a more restrictive state. Of course, when resource usage reaches an acceptable level, the resource manager may also inform each resource entity (or previously selected resource entities) that they may set their resource consumption state to a less restrictive state.

46 Claims, 7 Drawing Sheets

OTHER PUBLICATIONS

Philippe Bernadat, Laura Feeney, Dan Lambright, and Franco Travostino, "*Java Sandboxes meet Service Guarantees: Secure Partitioning of CPU and Memory*," Dec. 14, 1998, 24 pp.

Li Gong, "*Secure Java Class Loading*," Nov.–Dec. 1998, Mobile Code Security, pp. 56–61.

Chris Hawblitzel, Chi–Chao Chang, Grzegorz Czajkowski, Deyu Hu, and Thorsten von Eicken, "*Implementing Multiple Protection Domains in Java*," Technical Report 97–1660, Department of Computer Science, Cornell University, 15 pp.

William F. Foote, et al, "Terminating A Group of Related Threads By Modifying The Prog Ram Counter Of Selected Stack Frames," U.S. Appl. No. 09/536,253, filed Mar. 27, 2000, 32 Pages.

William F. Foote, "Apparatus And Methods For Preventing Denial Of Service Attacks," U.S. Appl. No. 09/394,121, filed Sep. 10, 1999, 42 Pages.

William F. Foote, "Apparatus And Methods For Managing Resource Usage," U.S. Appl. No. 09/394,118, filed Sep. 10, 1999, 36 Pages.

William F. Foote, et al, "Apparatus And Methods For Communicating Between Resource Domains," U.S. Appl. No. 09/727,103, filed Nov. 29, 2000, 32 Pages.

Hideya Kawahara, William F. Foote, and Dean R.E. Long, "Clean Thread Termination", U.S. Appl. No. 09/846,064, filed Apr. 30, 2001, 25 Pages.

\* cited by examiner

RESOURCE MANAGING SYSTEM FOR CHANGING RESOURCE CONSUMPTION STATE OF THE LOWER PRIORITY RESOURCE ENTITY TO MORE RESTRICTIVE STATE WHEN RESOURCE REACHED CRITICAL LEVEL

CROSS-REFERENCE TO RELATED APPLICATION

This application claims priority to U.S. Provisional Application No. 60/290,309 filed May 10, 2001 entitled "RESOURCE MANAGEMENT FOR RESOURCE CONSTRAINED DEVICES" by William F. Foote and Hideya Kawahara, which application is incorporated by reference in its entirety for all purposes.

BACKGROUND OF THE INVENTION

The invention relates generally to software applications and, more particularly, to methods and apparatus for managing resource usage in an object-based system.

In the consumer field, there is intense pressure to keep costs down. Thus, the capabilities of memory and CPU devices within consumer systems, for example, are scaled down as much as possible to minimize overall costs. For example, cable television set top boxes typically include limited memory space and CPU capabilities. As object-based systems are integrated within consumer devices, it is becoming more important to manage resource usage effectively within the object-based systems. In other words, as a result of limited resources (among other reasons), a major issue within the object-oriented field is how to track and manage resource usage.

In the JavaOS platform, the virtual machine is configured to classify resource availability into three states: RED, YELLOW and GREEN. Additionally, the virtual machine tracks resource availability, such as available Java heap space. If resource availability is within acceptable limits, resource availability is classified as being in GREEN mode. If a resource is reaching an unacceptable level of availability, resource availability is then classified as being in YELLOW mode. When in YELLOW mode, a request is sent to all applications to lower their resource usage. The notified applications are all expected to free up resources. If resource availability becomes worse (e.g., applications are not freeing up enough resources), the system can then go into a RED state. A RED state may indicate that one or more applications or other resource-consuming entities must be terminated to make resources available. As resources became available, the system can be put back into GREEN mode.

Although this conventional resource management scheme works well in some environments, it tends to be inefficient in systems in which multiple applications are simultaneously executing. When the multiple applications receive a request to lower their resource consumption, all of the applications may simultaneously begin freeing up resources. This conventional resource management schemes does not differentiate between applications. That is, all applications receive a same request to lower resource usage. Thus, a lower priority application may not necessarily lower its resource usage prior to a higher priority application lowering its resource usage. Additionally, an application that is using a disproportionate amount of resources may not relinquish its resources before several other applications that are minimally using resources relinquish all of the their resource usage and self-terminate. These scenarios are inefficient at best. Additionally, the virtual machine does not know the specifics of individual resource usage by each application.

Accordingly, there is a need for improved mechanisms for efficiently managing resource usage by applications based on each individual application's resource usage characteristics or any other suitable criteria.

SUMMARY OF THE INVENTION

Broadly speaking, the present invention fills these needs by providing apparatus and methods for managing resources. In general terms, a resource manager manages resource consumption of several resource entities which are each capable of consuming resources. The resource manager tracks the availability of such resources and determines whether a resource is critically short or reaches a particular usage level. When a resource becomes critically short or reaches a particular usage level, the resource manager selects one or more resource entities based on one or more criteria. For example, a resource entity which has the least restrictive resource usage policy or state is selected. The resource manager then requests that the selected resource entity changes its resource usage state to a more restrictive state. Of course, when resource usage reaches an acceptable level, the resource manager may also inform each resource entity (or previously selected resource entities) that they may set their resource consumption state to a less restrictive state.

In one embodiment, a method of managing resource usage by one or more resource entities is disclosed. Each resource entity is configured to consume one or more resources. It is determined whether a resource has reached a critical level. When it is determined that a resource has reached a critical level, a first resource entity is selected based on one or more criteria and the selected resource entity is requested to change its resource consumption state to a more restrictive state.

In a specific implementation, the one or more criteria include a priority value for each resource entity and the selected resource entity has a relatively lower priority than other one or more resource entities that are not selected. In another implementation, the one or more criteria include a current resource consumption state of each resource entity and the selected resource entity has a relatively less restrictive current resource consumption state than one or more other resource entities that are not selected.

In a further implementation, when the selected resource entity does not change its resource consumption state when requested to do so, it is determined whether to request the selected resource entity a second time to change its resource consumption state to the previously requested more restrictive state and the selected resource entity is requested a second time to change its resource consumption state to the previously requested more restrictive state.

In another embodiment, when it is determined not to request the selected resource entity a second time, the selected resource entity is terminated. Additionally, determining whether to request the selected resource entity a second time is based on whether the selected resource entity has failed to change its resource consumption when requested to do so within a predetermined time limit. Alternatively, determining whether to request the selected resource entity a second time is based on whether a resource is still at a critical level. In yet another embodiment, determining whether to request the selected resource entity a second time is based on whether a second resource entity may be selected and requested to change its resource consumption to a more restrictive state. In another aspect, determining whether to request the selected resource entity a second time is based on whether the selected resource entity has indicated a reduction in resource usage.

In a further implementation, requesting the selected resource entity to change its resource consumption state to a more restrictive state is performed through a ResourceNotificationList to which a plurality of resource entities are registered. Additionally, the selected resource entity's current resource consumption state is obtained through the ResourceNotificationList prior to requesting the selected resource entity to change its resource consumption state to a more restrictive state.

In another embodiment, when the selected resource entity changes to the requested state, it determined again whether any resource is still at a critical level. When it is determined that a resource is at a critical level, a second resource entity is selected based on one or more criteria and the second selected resource entity is requested to change its resource consumption state to a more restrictive state. In one aspect, the first selected resource entity equals the second selected resource entity. Additionally, the second selected resource entity is told to return to its least restrictive resource consumption state when it is determined that no resources have reached a critical level. In a further aspect, the request is forwarded to a second resource entity whose resource usage is managed by an application associated with the first resource entity.

In another aspect, the invention pertains to a computer system operable to manage resource usage by one or more resource entities. The computer system includes a memory and a processor coupled to the memory. The memory and the processor are adapted to provide the above described methods. In another embodiment, the invention pertains to a computer readable medium having instructions for managing resource usage by one or more resource entities. The computer readable medium includes computer code for performing the above described methods.

Advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to necessarily obscure the present invention.

In general, the invention pertains to methods and apparatus for a resource manager to individually manage multiple resource entities that each consume one or more resources, such as the Java heap. That is, the resource manager may request a selected resource entity (RE) to change its resource consumption state based on specific criteria. By way of example, the criteria for selecting an RE and/or the specific type of state change for the selected RE may include the current resource consumption state of each RE. In one case, the RE that is in a least restrictive resource consumption state (i.e., that will likely result in more resources being consumed by this RE than a more restricted RE) is selected and asked to change its resource consumption state to a more restrictive state (i.e., that will likely result in less resources being consumed by the selected RE). In another example, the criteria includes RE priority, and the RE that has the lowest priority is selected and requested to change its resource consumption state to a more restrictive state.

The resource consumption states that are possible for each RE may be defined or categorized in any suitable manner. In the illustrated embodiment, there are five states: NORMAL, FAVOR_SPACE, ESSENTIAL_ONLY, TERMINATE_GRACEFULLY, and TERMINATE_ABRUPTLY. An RE in a NORMAL state does not have to conserve resources. That is, the NORMAL state RE may use as much resources as it requires. An RE in a FAVOR_SPACE state favors space over speed. An RE in an ESSENTIAL_ONLY state conserves space by only using resources essential to proper operation. An RE in a TERMINATE_GRACEFULLY state gracefully shuts down its activities. In contrast, an RE in a TERMINATE_ABRUPTLY state immediately shuts down its activities. While some of these states may be communicated to a selected RE as a request for the RE to change its state, other states may simply be imposed on the selected RE by the resource manager. For example, the resource manager may cause the selected RE to be abruptly terminated.

Figure 1:
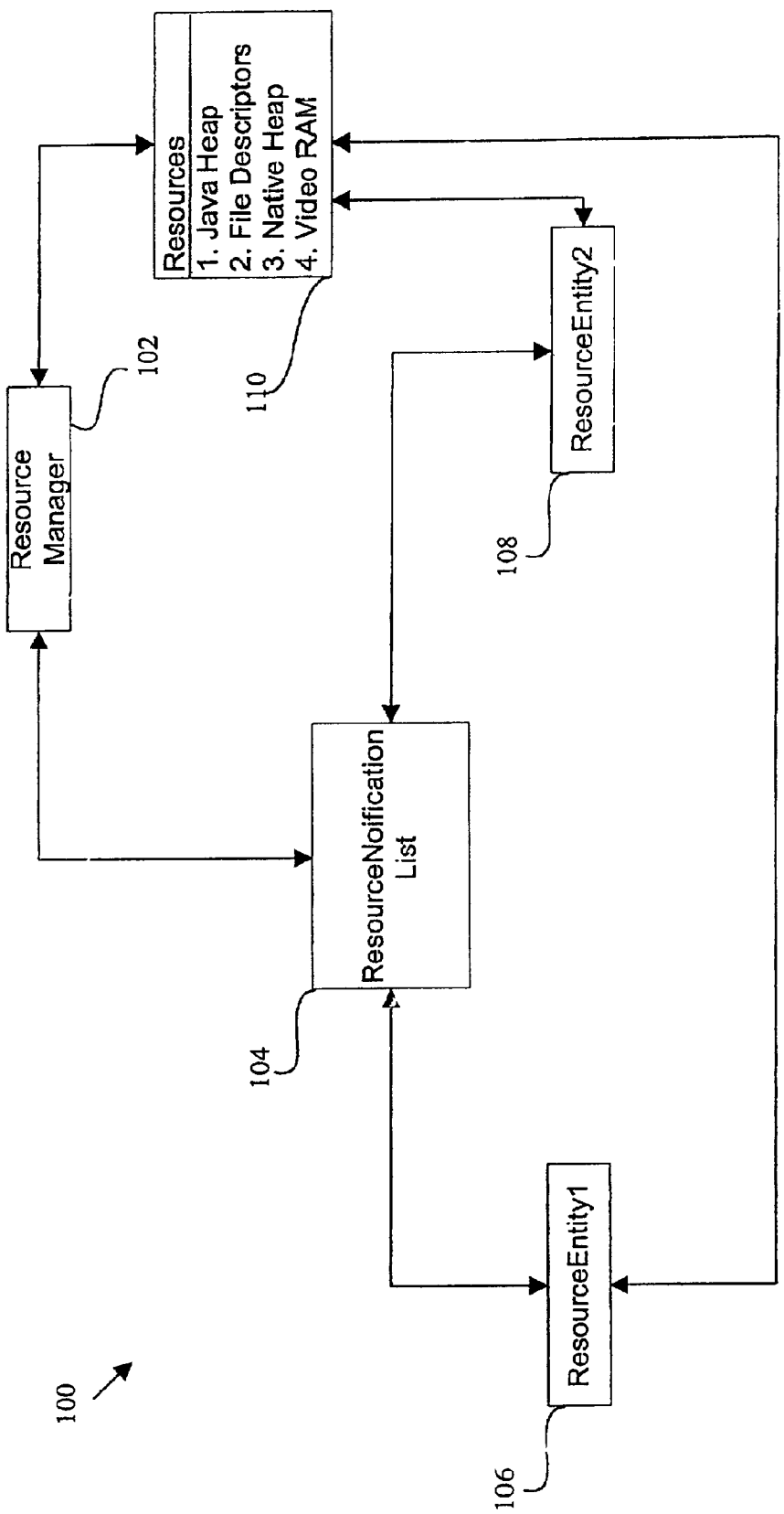
FIG. 1 is a diagrammatic representation of a resource management system in accordance with one embodiment of the present invention.

Any suitable mechanism may be implemented for individually selecting and requesting one or more resource entity(s) to change their resource consumption state, and the selection and/or request may be based on any suitable criteria. FIG. 1 is a diagrammatic representation of a resource management system 100 in accordance with one embodiment of the present invention. As shown, the system 100 includes a resource manager 102 configured to track the availability of resources 110. The resources may include any type of resource that is consumable by any type of software application or entity. By way of illustration, the resources 110 may include a Java heap, file descriptors, a native heap, video RAM, hardware resources such as MPEG Section filters, and persistent storage such as a file on a hard disk. The resource manager 102 also manages one or more resource entities (e.g., 106 and 108) or "RE's" which each consumes one or more resource types, via a "ResourceNotificationList" 104. That is, resource manager 102 manages consumption of one or more resources 110 by one or more RE's.

Management of resources may be implemented through any suitable software and/or hardware construct. In the illustrated example, the resource manager 102 communicates resource consumption requests or changes to each RE through the ResourceNotificationList 104. Likewise, each RE communicates its own resource consumption policies or states to the resource manager 102 via ResourceNotificationList 104. In the illustrated embodiment, the ResourceNotificationList 104 includes specific callbacks for the resource manager to access and manage each resource entity. For example, the resource manager may request that a particular RE change its resource consumption state to a more restrictive state (i.e., which consumes less resources) via the ResourceNotificationList 104. In one response example, the particular RE may then respond via the ResourceNotificationList 104 that it has changed its current state to the requested state or request to remain in its current state.

Figure 2:
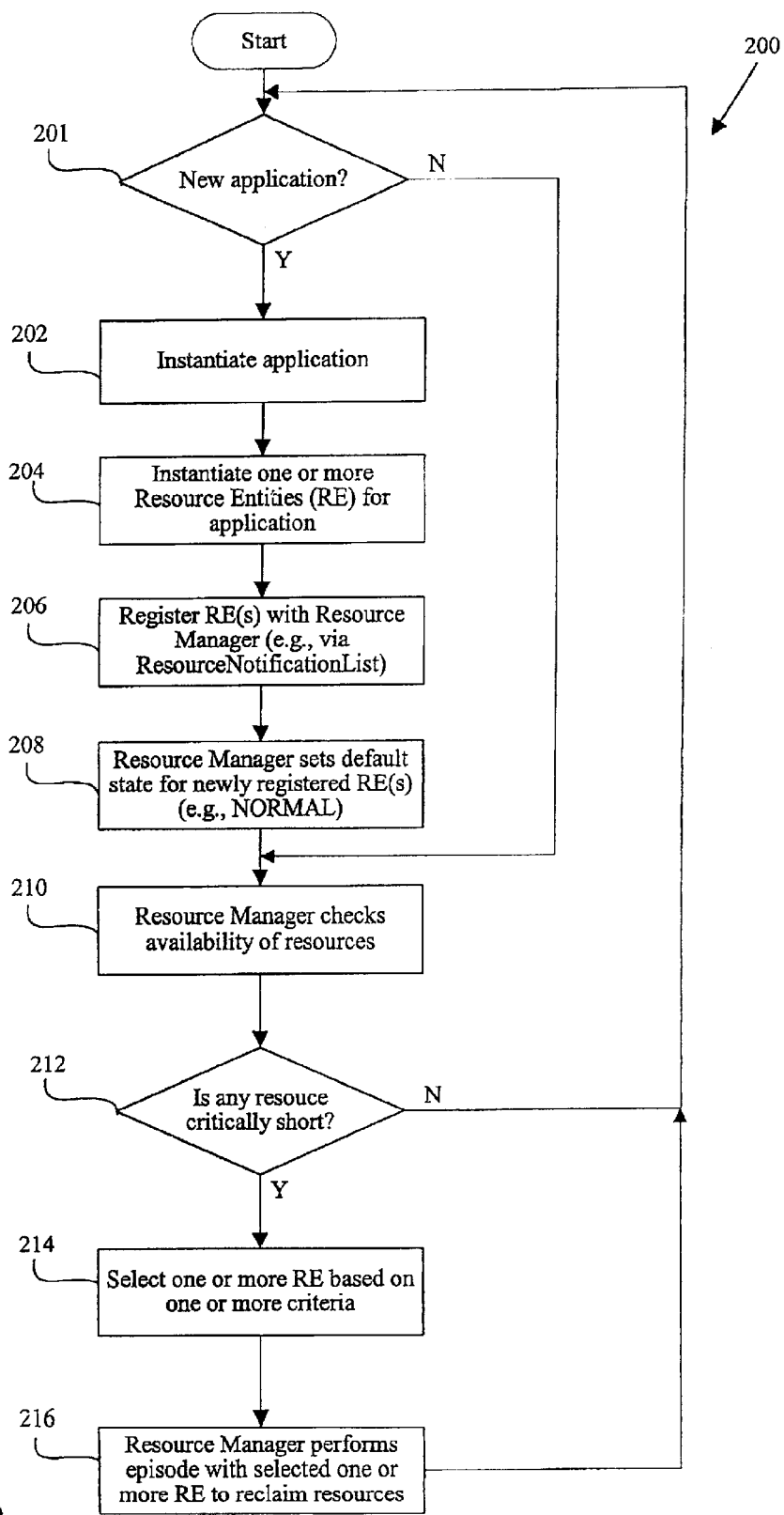
FIG. 2 is a flowchart illustrating a procedure for managing resources in accordance with one embodiment of the present invention.

FIG. 2 is a flowchart illustrating a procedure 200 for managing resources in accordance with one embodiment of the present invention. The illustrated implementation of FIG. 2 is generally a continuous process that includes setting up communication constructs between each new RE and the resource manager, monitoring computer resources, and making requests to selected RE's to change their resource usage based on such monitoring. Alternatively, resources may be periodically monitored in a process separate from the communication setup procedure. When a resource limit is reached, an activity may then be triggered that selects an RE and requests the selected RE to change its resource consumption state.

Referring back to the illustrated embodiment of FIG. 2, one or more processes may be set up that may each consume one or more resources. For example, an application, such as a browser, may include one or more process entities, such as applets or Xlets. Each process entity may also be represented by one or more RE's that consume one or more resources. As shown, it is determined whether a new application is present in operation 201. If there is a new application, the new applications is set up in operations 202 through 208. Otherwise, these operations are skipped. In operation 202, the application is instantiated. The application may then instantiate one or more resource entity(s) (RE) in operation 204. The instantiated RE(s) are then each registered with the resource manager in operation 206.

The resource manager may then set a default state for each newly registered RE in operation 208. For instance, each RE is put in a NORMAL resource consumption state. Alternatively, each RE (or the controlling application) may set its own initial resource consumption state. Additionally, the resource manager may assume that each RE is set in a particular state (e.g., NORMAL) prior to making any requests for a state change to a selected RE.

The resource manager may then check for availability of resources in operation 210. It is then determined whether any resource is critically short in operation 212. A resource may be "critically short" when the available resource amount or percentage falls below a predetermined level or the resources usage amount or percentage rises above another predetermined level. If no resource is critically short, the resource manager continues to check the availability of resources in operation 210. If any resource is critically short, one or more RE are selected based on one or more criteria in operation 214. An RE may be selected based on a comparison of the relative resource consumption states of each RE or the relative priorities of each RE. For example, an RE having the lowest priority and/or the least restrictive resource consumption state (e.g. NORMAL) is selected. The resource manager then performs an episode with the selected one or more RE to reclaim resources in operation 216.

An episode is generally defined as a communication session between the resource manager and the selected RE. The episode includes the resource manager requesting the selected RE to change to a different state, the selected RE's response to such request, and/or the resource manager's response to the RE's response. The episode may end with the selected RE when the resource manager determines that the RE has satisfactorily complied with the request, the request no longer needs to be followed by the selected RE, or the RE is to be terminated.

Figure 3:
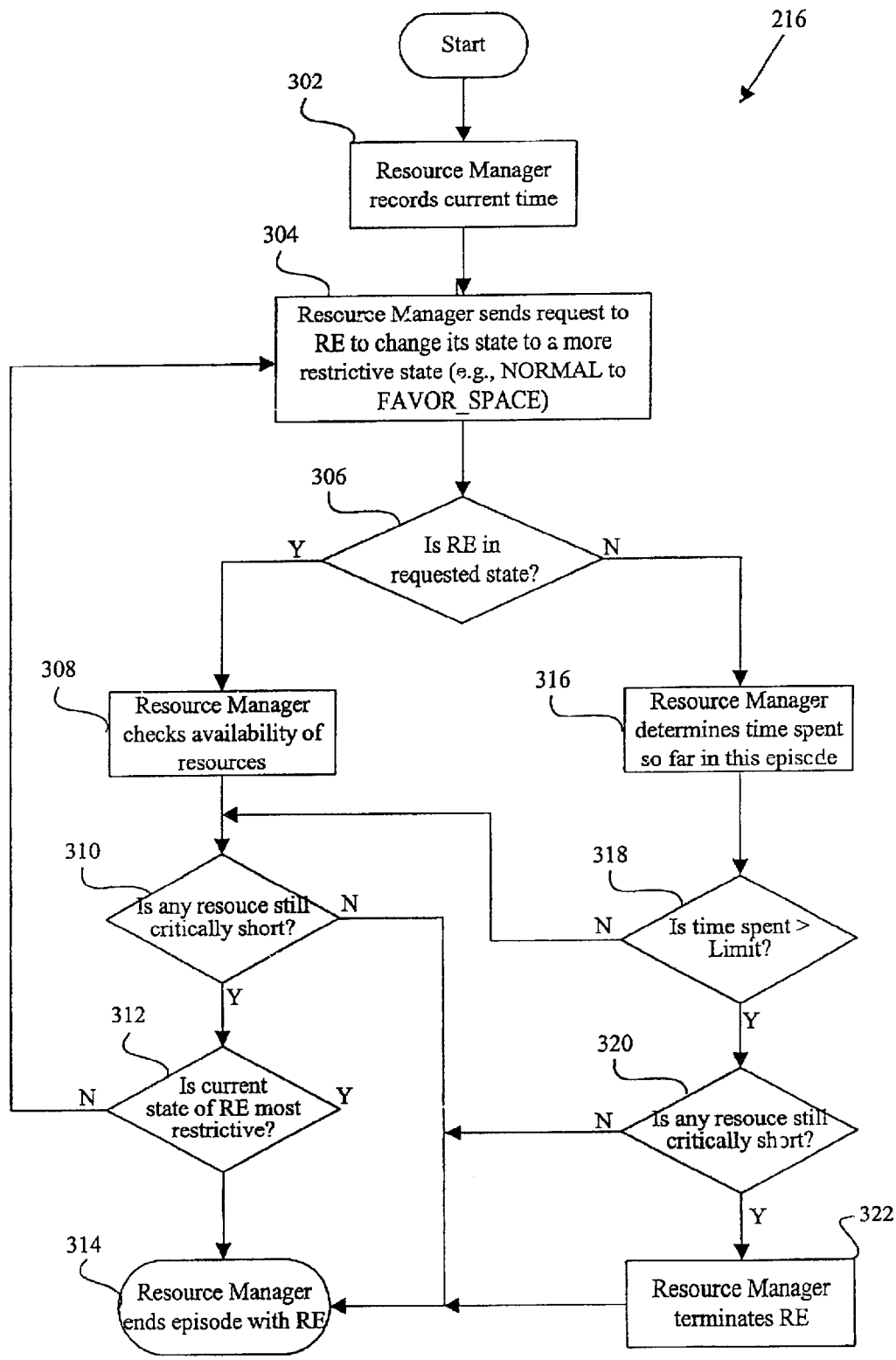
FIG. 3 is a flowchart illustrating the operation of FIG. 2 for performing an episode with a selected resource entity (RE) to facilitate reclamation of resources from the selected RE in accordance with one embodiment of the present invention.

FIG. 3 is a flowchart illustrating the operation 216 of FIG. 2 for performing an episode with a selected resource entity in accordance with one embodiment of the present invention. However, the illustrated process of FIG. 3 represents merely one example of a resource manager's policy for managing resources with respect to a selected RE and is not meant to limit the scope of the invention to the described example policy. That is, the resource manager may implement any suitable resource management policy with respect to a selected RE.

As shown, the resource manager records the current time in operation 302. The recorded time is later used to determine how long the selected RE has spent responding to a resource shortage. The resource manager then sends a request to the selected RE to change its state to a more restricted state in operation 304. For example the resource manager requests that the selected RE change its NORMAL state to a FAVOR_SPACE state. The resource manager determines what state to request of the selected RE in any suitable manner. In one example, the resource manager initially queries the RE for its current state. Alternatively, the resource manager may assume that the selected RE is in a particular default state (e.g., NORMAL) or in the last requested state.

It is then determined whether the selected RE is now in the requested state in operation 306. That is, it is determined whether the RE has satisfied the request from the resource manager. The resource manager may determine the state of the selected RE in any suitable manner. In one example, the resource manager may query the RE for its current state. In another embodiment, the RE responds to the request from the resource manager by indicating its current state. The system may also track resource usage of the entity (e.g., application) of which the RE is a part, instead of the RE changing its state.

If the RE is in the requested state, the resource manager again checks the availability of resources in operation 308. It is then determined whether any resource is still critically short in operation 310. If no resources are short, the episode ends in operation 314. Ending an episode may include informing the selected RE that it may change its state back to the less restrictive state (e.g., NORMAL).

However, if any resource is still critically short, it may then be determined whether the RE is already in the most restrictive state it can have in operation 312. If this is the most restrictive state for the RE, the episode ends in operation 314. Additionally, if resources are still critically short, the RE may be terminated. If this is not the most restrictive state for the RE, the resource manager then sends another request to the RE to change its state to a more restrictive state than its current state in operation 304 and the entire process repeats. For example, the RE is requested to go from a FAVOR_SPACE state to an ESSENTIAL_ONLY state.

If at some point the selected RE does not change to the request state, the resource manager then determines the time spent in this episode in operation 316. It may then be determined whether the elapsed time is greater than a specified limit in operation 318. For example, the limit may be set to one second. If the elapsed time is greater than the specified limit, it is then determined whether any resource is still critically short in operation 320. If no resource is short, the resource manager ends the episode with the RE without further action with respect to the selected RE. Alternatively, the resource manager may inform the selected RE that it may move to a less restrictive state (e.g., NORMAL). In an alternative approach, the RE is terminated as soon as the specified timeout limit is reached.

However, if a resource is still critically short, the resource manager terminates the unresponsive RE in operation 322 and then ends the episode in operation 314. If the elapsed time is not greater than the specified limit, it is then determined whether any resource is still critically short in operation 310. The operations for handling an RE that changed to a previously requested state are then followed. For example, the RE may again receive a request to change to a more restrictive state until resources are not critical.

The resource manager may alternatively determine whether to terminate an unresponsive RE based on whether the RE has indicated that it has reduced its resource consumption amount. For example, when an RE has reduced its consumption amount without changing its resource state, the resource manager may decide not to terminate the RE after the elapsed time has reached a first predetermined limit. In a further implementation, the RE may be terminated when the elapsed time reaches a second higher predetermined limit. In yet another embodiment, termination of the unresponsive RE may be based on whether another RE is available for sending a request to change its resource consumption state. That is, the unresponsive RE is not terminated when another RE is available for requesting a state change.

Any suitable termination technique may be implemented. One solution "thread.stop" is currently available as a resource within the Java™ II Standard Development Kit. Thread.stop throws an exception so that a currently executing method may "catch" the exception and execute any implemented clean up code. Several other embodiments for terminating related threads are described in co-pending U.S. patent application Ser. No. 09/394,121 entitled, "FOR PREVENTING DENIAL OF SERVICE ATTACKS" filed on 10 Sep. 1999 by William F. Foote and U.S. patent application Ser. No. 09/536,253 entitled, "TERMINATING A GROUP OF RELATED THREADS BY MODIFYING THE PROGRAM COUNTER OF SELECTED STACK FRAMES" filed on 27 Mar. 2000 by William F. Foote et al. These applications have assignment rights in common and are incorporated herein by reference in its entirety.

Some of the termination techniques described in the above referenced related patent applications include popping frames of a thread stack that are associated with misbehaving code (i.e., an unresponsive RE or an that is consuming excessive resources) are popped from the thread stack. Exception handling code is allowed to execute for trusted code by popping the trusted code frame via processing an exception, but exception handling is not allowed to execute for untrusted code. In a second aspect, frames are popped on all thread stacks of all threads that are associated with the misbehaving code. Threads are generally deemed to be associated with the misbehaving code when the threads share a same object or the same resources as the thread that is associated with the misbehaving code.

In other termination procedures, thread stacks associated with the misbehaving code are modified so that the thread aborts automatically after modification. A thread is generally deemed to be associated with the misbehaving code if the thread's stack has a program counter within a method associated with the misbehaving code (or the thread is executing methods associated with the misbehaving code). Frames within a stack that is associated with misbehaving code can be divided into two groups: trusted frames and untrusted frames. Trusted frames may be allowed to terminate on their own, while untrusted frames are modified to terminate without executing any remaining untrusted code. In other words, frames that reference untrusted code are not allowed to execute.

Figure 4:
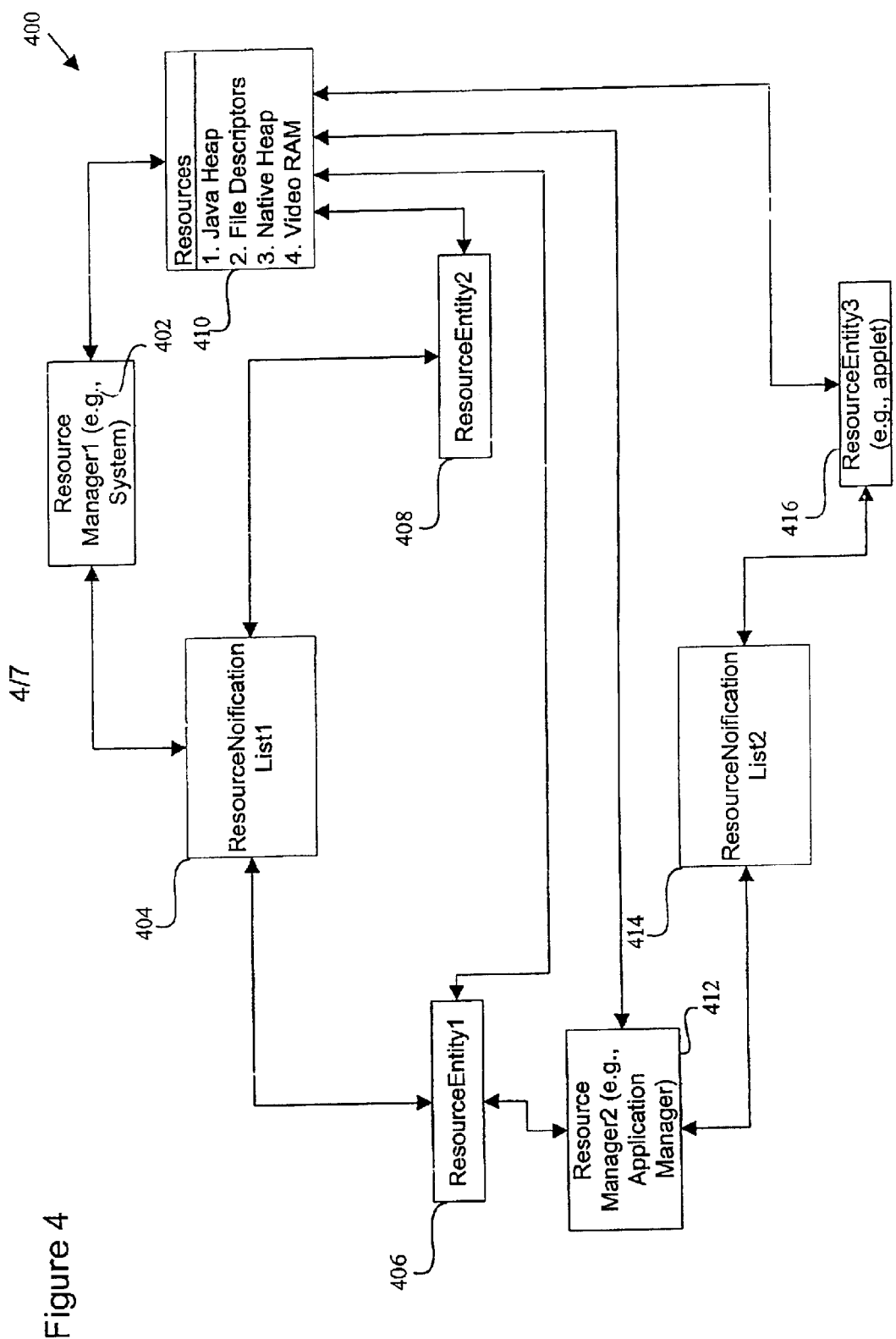
FIG. 4 is a diagrammatic representation of a resource management system with multiple and hierarchically arranged resource entities in accordance with an alternative embodiment of the present invention.

FIG. 4 is a diagrammatic representation of a resource management system 400 with multiple and hierarchically arranged resource entities in accordance with an alternative embodiment of the present invention. As shown, the system 400 includes a first resource manager 402 that manages resources 410 and the resource usage of a first RE 406 and a second RE 408 through a first ResourceNotificationList 404. For example, the first RE 406 forms part of an application 412 such as a web browser and the second RE 408 is a video conference application. In this example, the application 412 also serves as a second resource manager that is configured to manage one or more of resources 410 and the resource usage of a third RE 416. By way of example, the third RE 416 is an applet or Xlet that consumes a cache that is managed by the browser application 412.

Figure 5:
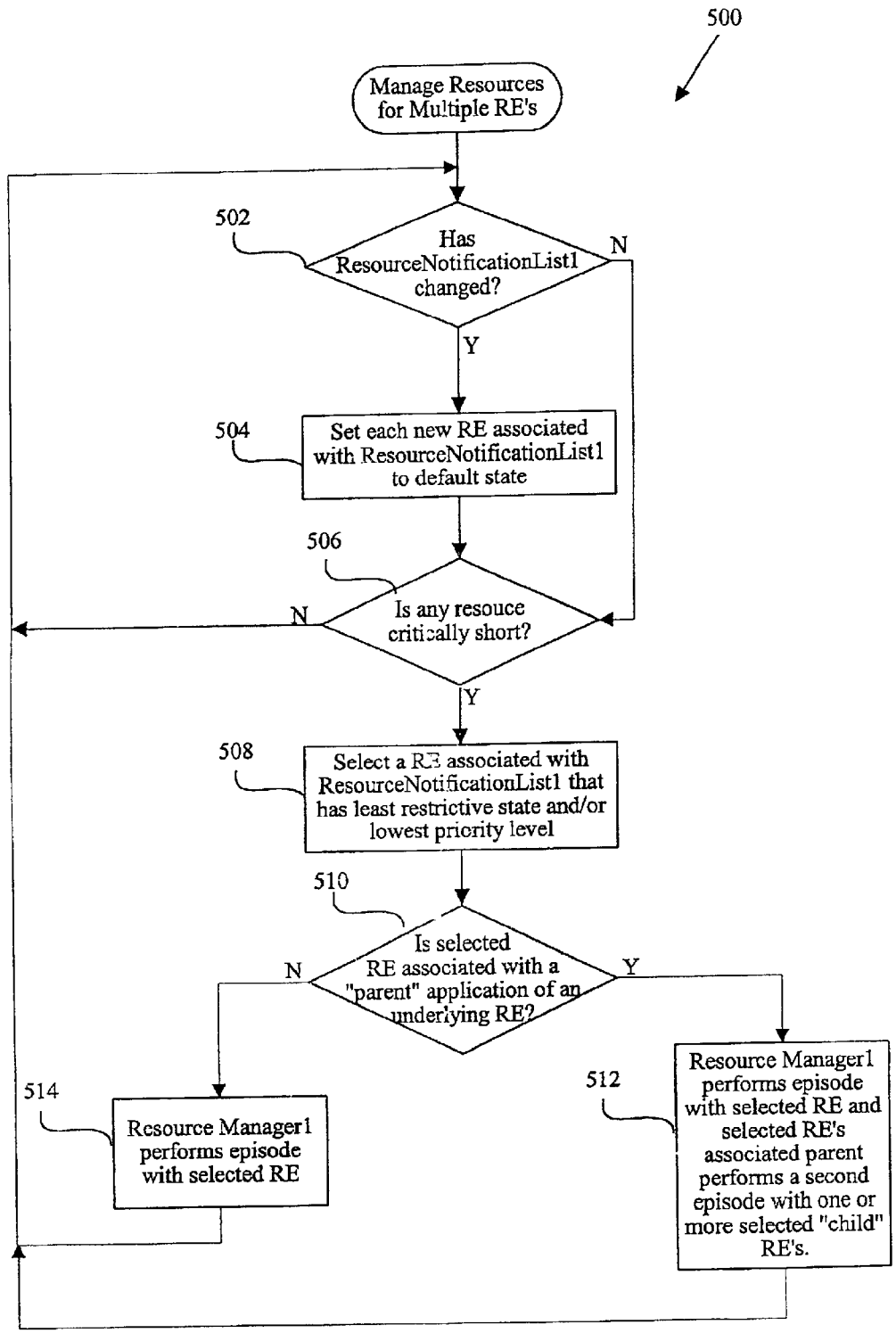
FIG. 5 is a flowchart illustrating a procedure for managing the resource consumption of multiple and hierarchical resource entities in accordance with an alternate embodiment.

FIG. 5 is a flowchart illustrating a procedure 500 for managing the resource consumption of multiple and hierarchical resource entities in accordance with an alternate embodiment. This procedure is described in conjunction with the system 400 of FIG. 4. It is assumed that the ResourceNotificationList 404 is already set up for one or more RE's. Initially, it is determined whether the first ResourceNotificationList 404 has changed in operation 502. A change may include an addition of a registered new RE. If the first list 404 has changed, each newly registered RE (e.g., 406 or 408) associated with the first list 404 is then set to a default state in operation 504. If the first list 404 has not changed, operation 504 is skipped.

It is then determined whether any resources are critically short in operation 506. If no resource is critically short, the procedure 500 returns to the beginning operation 502. If a resource is critically short, an RE associated with the first list 404 that has the least restrictive state and/or lowest priority level is then selected in operation 508. It is then determined whether the selected RE is associated with an application that is a parent of another underlying RE in operation 510. In the illustrated example, the RE 406 is associated with an application 412 that is a parent of underlying RE 416.

If the selected RE is associated with a parent application, the first resource manager 402 performs an episode with the selected RE and the selected RE's associated application (e.g., 412) performs a second episode with one or more selected children RE in operation 512. In other words, the associated application serves as a resource manager of its underlying RE's. If the selected RE is not associated with a parent of another underlying RE, the first resource manager 402 performs an episode with only the selected RE in operation 514. The episodes may include any suitable resource management policies being implemented on a selected RE, for example, as described above with respect to FIG. 3. The procedure 500 then repeats.

Figure 6:
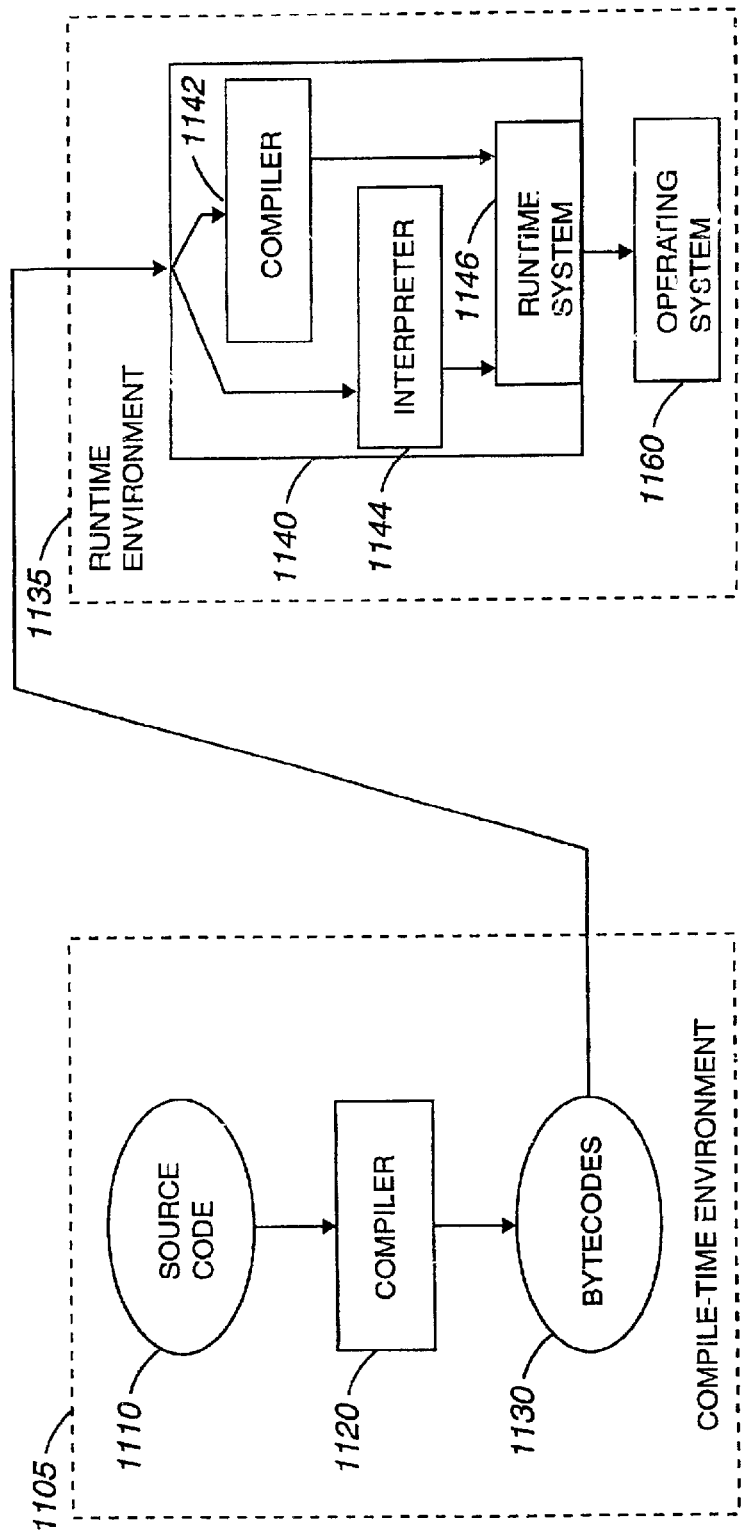
FIG. 6 is a diagrammatic representation of a general-purpose computer system suitable for implementing the present invention.

FIG. 6 illustrates a typical, general-purpose computer system suitable for implementing the present intention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, the computer system may be integrated with a navigational system or television set top box.

Computer system 1030 or, more specifically, CPUs 1032, may be arranged to support a virtual machine, as will be appreciated by those skilled in the art. One example of a virtual machine that is supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described mechanisms for managing resources. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
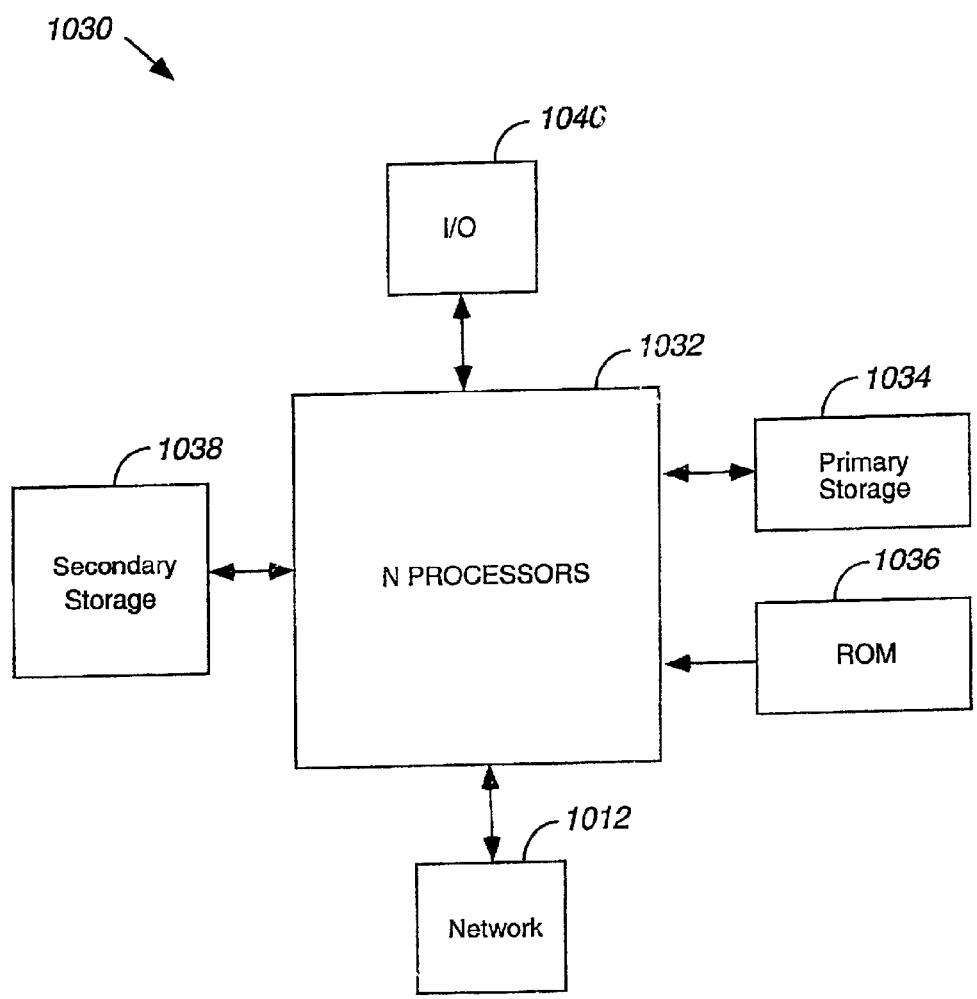
FIG. 7 is a diagrammatic representation of a virtual machine suitable for implementing the present invention.

As previously mentioned, a virtual machine may execute on computer system 1030. FIG. 7 is a diagrammatic representation of a virtual machine which is supported by computer system 1330 of FIG. 6, and is suitable for implementing the present invention. When a computer program, e.g. a computer program written in the Java™ programming language, is executed, source code 1110 is provided to a compiler 1120 within compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 6, or stored on a storage device such as primary storage 1034 of FIG. 6. In the described embodiment, byte codes 1130 are platform independent. That is, byte codes 1130 may be executed on substantially any computer system that is running on a suitable virtual machine 1140.

Byte codes 1130 are provided to a runtime environment 1135 which includes virtual machine 1140. Runtime environment 1135 may generally be executed using a processor or processors such as CPUs 1032 of FIG. 6. Virtual machine 1140 includes a compiler 1142, an interpreter 1144, and a runtime system 1146. Byte codes 1130 may be provided either to compiler 1142 or interpreter 1144.

When byte codes 1130 are provided to compiler 1142, methods contained in byte codes 1130 are compiled into machine instructions. In one embodiment, compiler 1142 is a just-in-time compile which delays the compilation of methods contained in byte codes 1130 until the methods are about to be executed. When byte codes 1130 are provided to interpreter 1144, byte codes 1130 are read into interpreter 1144 one byte code at a time. Interpreter 1144 then performs the operation defined by each byte code as each byte code is read into interpreter 1144. That is, interpreter 1144 "interprets" byte codes 1130, as will be appreciated by those skilled in the art. In general, interpreter 1144 processes byte codes 1130 and performs operations associated with byte codes 1130 substantially continuously.

When a method is invoked by another method, or is invoked from runtime environment 1135, if the method is interpreted, runtime system 1146 may obtain the method from runtime environment 1135 in the form of a sequence of byte codes 1130, which may be directly executed by interpreter 1144. If, on the other hand, the method which is invoked is a compiled method which has not been compiled, runtime system 1146 also obtains the method from runtime environment 1135 in the form of a sequence of byte codes 1130, then may go on to activate compiler 1142. Compiler 1142 then generates machine instructions from byte codes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X) which is incorporated herein by reference.

Although only a few embodiments of the present invention have been described, it should be understood that the present invention may be embodied in many other specific forms without departing from the spirit or the scope of the present invention. By way of example, the operations involved with managing resources may be reordered. Steps may also be removed or added without departing from the spirit or the scope of the present invention.

Although the techniques for managing resources in accordance with the present invention are particularly suitable for implementation with respect to a Java™ based environment, the techniques may generally be applied in any suitable object-based environment. In particular, the techniques are suitable for use in platform-independent object-based environments. It should be appreciated that the methods may also be implemented in some distributed object-oriented systems.

By way of a further example implementation, the resource manager may manage resource usage according to the type of resource that is critically short. In this example, the selected resource entity may have a resource consumption state for each resource type and the resource manager requests that the selected resource entity changes its state for the specific type of resource which is critically short.

Accordingly, the present embodiments are to be considered as illustrative and not restrictive, and the invention is not to be limited to the details given herein, but may be modified within the scope and equivalents of the appended claims.

What is claimed is:

1. A computerized method of managing resource usage by one or more resource entities, wherein each resource entity is configured to represent an entity that consumes one or more resources, the method comprising:
   in an object-based computing system, continuously determining by a resource manager with which each resource entity is registered whether a resource has reached a critical level;
   when it is determined that a resource has reached a critical level, selecting by the resource manager, a first resource entity based on one or more criteria, wherein the one or more criteria include a priority value for each resource entity and wherein the selected resource entity has a relatively lower priority than other one or more resource entities that are not selected; and
   when it is determined that a resource has reached a critical level, requesting by the resource manager that the selected resource entity change its resource consumption state to a more restrictive state by performing the request through a list to which a plurality of resource entities are registered.

2. A method as recited in claim 1, wherein the one or more criteria include a current resource consumption state of each resource entity and wherein the selected resource entity has a relatively less restrictive current resource consumption state than one or more other resource entities that are not selected.

3. A method as recited in claim 1, further comprising:
   when the selected resource entity does not change its resource consumption state when requested to do so, determining by the resource manager whether to request the selected resource entity a second time to change its resource consumption state to the previously requested more restrictive state; and
   when it is determined to request the selected resource entity a second time, requesting by the resource manager that the selected resource entity a second time change its resource consumption state to the previously requested more restrictive state.

4. A method as recited in claim 3, further comprising terminating by the resource manager the selected resource entity when it is determined not to request the selected resource entity a second time.

5. A method as recited in claim 4, wherein determining whether to request the selected resource entity a second time is based on whether the selected resource entity has failed to change its resource consumption when requested to do so within a predetermined time limit.

6. A method as recited in claim 4, wherein determining whether to request the selected resource entity a second time is based on whether a resource is still at a critical level.

7. A method as recited in claim 4, wherein determining whether to request the selected resource entity a second time is based on whether a second resource entity is operable to be selected and requested to change its resource consumption to a more restrictive state.

8. A method as recited in claim 4, wherein determining whether to request the selected resource entity a second time is based on whether the selected resource entity has indicated a reduction in resource usage.

9. A method as recited in claim 1, wherein the selected resource entity is operable to have or be requested to have a resource consumption state selected from a group consisting of a NORMAL state, a FAVOR_SPACE state, an ESSENTIAL_ONLY state, a TERMINATE_GRACEFULLY state, and a TERMINATE_ABRUPTLY state.

10. A method as recited in claim 1, wherein the resource is selected from a group consisting of a Java heap, a plurality of file descriptors, video RAM, a native heap, a hardware resource, and persistent storage.

11. A method as recited in claim 1, wherein the resource entity is contained within an entity selected from a group consisting of an application, an applet, and an Xlet.

12. A method as recited in claim 1, wherein the list is a ResourceNotificationList.

13. A method as recited in claim 12, further comprising obtaining the selected resource entity's current resource consumption state through the ResourceNotificationList prior to requesting the selected resource entity to change its resource consumption state to a more restrictive state.

14. A method as recited in claim 1, further comprising:
   when the selected resource entity changes to the requested state, determining again by the resource manager whether any resource is still at a critical level;
   when it is determined that a resource is at a critical level, selecting by the resource manager a second resource entity based on one or more criteria; and
   when it is determined that a resource is at a critical level, requesting by the resource manager that the second selected resource entity change its resource consumption state to a more restrictive state.

15. A method as recited in claim 14, wherein the first selected resource entity equals the second selected resource entity.

16. A method as recited in claim 15, further comprising telling the second selected resource entity by the resource manager to return to its least restrictive resource consumption state when it is determined that no resources have reached a critical level.

17. A method as recited in claim 1, further comprising forwarding the request to a second resource entity whose resource usage is managed by an application associated with the first resource entity.

18. A computer readable medium containing computer code having instructions for managing resource usage by one or more resource entities, wherein each resource entity is configured to represent an entity that consumes one or more resources, the computer readable medium comprising:

computer code for continuously determining by the resource manager with which each resource entity is registered whether a resource in an object-based computing system has reached a critical level;

computer code for selecting by the resource manager, a first resource entity based on one or more criteria when it is determined that a resource has reached a critical level, wherein the one or more criteria include a priority value for each resource entity and wherein the selected resource entity has a relatively lower priority than other one or more resource entities that are not selected; and computer code for requesting by the resource manager that the selected resource entity change its resource consumption state to a more restrictive state when it is determined that a resource has reached a critical level by performing the request through a list to which a plurality of resource entities are registered.

19. A computer readable medium as recited in claim 18, wherein the one or more criteria include a current resource consumption state of each resource entity and wherein the selected resource entity has a relatively less restrictive current resource consumption state than one or more other resource entities that are not selected.

20. A computer readable medium as recited in claim 18, further comprising:

computer code for determining by the resource manager whether to request the selected resource entity a second time to change its resource consumption state to the previously requested more restrictive state when the selected resource entity does not change its resource consumption state when requested to do so; and computer code for requesting by the resource manager that the selected resource entity a second time change its resource consumption state to the previously requested more restrictive state when it is determined to request the selected resource entity a second time.

21. A computer readable medium as recited in claim 20, further comprising computer code for terminating by the resource manager the selected resource entity when it is determined not to request the selected resource entity a second time.

22. A computer readable medium as recited in claim 21, wherein determining whether to request the selected resource entity a second time is based on whether the selected resource entity has failed to change its resource consumption when requested to do so within a predetermined time limit.

23. A computer readable medium as recited in claim 21, wherein determining whether to request the selected resource entity a second time is based on whether a resource is still at a critical level.

24. A computer readable medium as recited in claim 21, wherein determining whether to request the selected resource entity a second time is based on whether a second resource entity is operable to be selected and requested to change its resource consumption to a more restrictive state.

25. A computer readable medium as recited in claim 21, wherein determining whether to request the selected resource entity a second time is based on whether the selected resource entity has indicated a reduction in resource usage.

26. A computer readable medium as recited in claim 18, wherein the selected resource entity is operable to have or be requested to have a resource consumption state selected from a group consisting of a NORMAL state, a FAVOR_SPACE state, an ESSENTIAL_ONLY state, a TERMINATE_GRACEFULLY state, and a TERMINATE_ABRUPTLY state.

27. A computer readable medium as recited in claim 18, wherein the resource is selected from a group consisting of a Java heap, a plurality of file descriptors, video RAM, and a native heap.

28. A computer readable medium as recited in claim 18, wherein the resource entity is contained within an entity selected from a group consisting of an application, an applet, and an Xlet.

29. A computer readable medium as recited in claim 17, wherein the list is a ResourceNotificationList.

30. A computer readable medium as recited in claim 29, further comprising computer code for obtaining the selected resource entity's current resource consumption state through the ResourceNotificationList prior to requesting the selected resource entity to change its resource consumption state to a more restrictive state.

31. A computer readable medium as recited in claim 18, further comprising:

computer code for determining again by the resource manager whether any resource is still at a critical level when the selected resource entity changes to the requested state;

computer code for selecting by the resource manager a second resource entity based on one or more criteria when it is determined that a resource is at a critical level; and computer code for requesting by the resource manager that the second selected resource entity change its resource consumption state to a more restrictive state when it is determined that a resource is at a critical level.

32. A computer readable medium as recited in claim 31, wherein the first selected resource entity equals the second selected resource entity.

33. A computer readable medium as recited in claim 32, further comprising computer code for telling the second selected resource entity by the resource manager to return to its least restrictive resource consumption state when it is determined that no resources have reached a critical level.

34. A computer readable medium as recited in claim 18, further comprising computer code for forwarding the request to a second resource entity whose resource usage is managed by an application associated with the first resource entity.

35. An object-based computer system operable to manage resource usage by one or more resource entities, wherein each resource entity is configured to represent an entity that consumes one or more resources, said object-based computer system comprising:

a memory; and a processor coupled to the memory, wherein at least one of the memory and the processor are adapted to provide:

select a first resource entity based on one or more criteria, when it is determined that a resource has reached a critical level, wherein the one or more criteria include a priority value for each resource entity and wherein the selected resource entity has a relatively lower priority than other one or more resource entities that are not selected; and request the selected resource entity to change its resource Consumption state to a more restrictive state when it is determined that a resource has reached a critical level by performing the request through a list to which a plurality of resource entities are registered.

36. A computer system as recited in claim 35, wherein the one or more criteria include a current resource consumption state of each resource entity and wherein the selected resource entity has a relatively less restrictive current resource consumption state than one or more other resource entities that are not selected.

37. A computer system as recited in claim 35, further comprising:

when the selected resource entity does not change its resource consumption state when requested to do so, determining by the resource manager whether to request the selected resource entity a second time to change its resource consumption state to the previously requested more restrictive state; and when it is determined to request the selected resource entity a second time, requesting by the resource manager that the selected resource entity a second time change its resource consumption state to the previously requested more restrictive state.

38. A computer system as recited in claim 37, wherein when it is determined not to request the selected resource entity a second time, terminating the selected resource entity.

39. A computer system as recited in claim 38, wherein determining whether to request the selected resource entity a second time is based on whether the selected resource entity has failed to change its resource consumption when requested to do so within a predetermined time limit.

40. A computer system as recited in claim 38, wherein determining whether to request the selected resource entity a second time is based on whether a resource is still at a critical level.

41. A computer system as recited claim 38, wherein determining whether to request the selected resource entity a second time is based on whether a second resource entity is operable to be selected and requested to change its resource consumption to a more restrictive state.

42. A computer system as recited in claim 38, wherein determining whether to request the selected resource entity a second time is based on whether the selected resource entity has indicated a reduction in resource usage.

43. A computer system as recited in claim 35, further comprising:

when the selected resource entity changes to the requested state, determining again by the resource manager whether any resource is still at a critical level;

when it is determined that a resource is at a critical level, selecting by the resource manager a second resource entity based on one or more criteria; and when it is determined that a resource is at a critical level, requesting by the resource manager that the second selected resource entity change its resource consumption state to a more restrictive state.

44. A computer system as recited in claim 43, wherein the first selected resource entity equals the second selected resource entity.

45. A computer system as recited in claim 44, further comprising telling the second selected resource entity by the resource manager to return to its least restrictive resource consumption state when it is determined that no resources have reached a critical level.

46. A computer system as recited in claim 35, further comprising forwarding the request to a second resource entity whose resource usage is managed by an application associated with the first resource entity.

* * * * *

UNITED STATES PATENT AND TRADEMARK OFFICE
CERTIFICATE OF CORRECTION

PATENT NO. : 7,073,177 B2 Page 1 of 1
APPLICATION NO. : 10/045514
DATED : July 4, 2006
INVENTOR(S) : Foote et al.

It is certified that error appears in the above-identified patent and that said Letters Patent is hereby corrected as shown below:

Column 4, line 23, change "necessarily" to --unnecessarily--.

Column 9, line 13, "change "intention" to --invention--.

Column 10, line 7, change "system 1330" to --system 1030--.

In line 1 of claim 41 (column 16, line 1) add --in-- after "recited".

Signed and Sealed this

Twenty-eighth Day of November, 2006

JON W. DUDAS
*Director of the United States Patent and Trademark Office*